United States Patent [19]
Ehrlich

[11] 3,900,131
[45] Aug. 19, 1975

[54] STUD FEEDER FOR STUD WELDING TOOLS

[75] Inventor: Don E. Ehrlich, Avon, Ohio

[73] Assignee: TRW Inc., Cleveland, Ohio

[22] Filed: Aug. 27, 1973

[21] Appl. No.: 392,128

Related U.S. Application Data

[63] Continuation of Ser. No. 275,675, July 27, 1972, abandoned, which is a continuation of Ser. No. 41,691, May 25, 1970, abandoned, which is a continuation of Ser. No. 723,852, April 24, 1968, abandoned.

[52] U.S. Cl................................. 221/169; 221/278
[51] Int. Cl............................................... B65h 9/00
[58] Field of Search ........... 221/169, 167, 168, 170, 221/182, 278, 236; 85/DIG. 3, 5 P

[56] References Cited
UNITED STATES PATENTS

| | | | |
|---|---|---|---|
| 1,540,735 | 6/1925 | Kroff | 85/DIG. 3 |
| 2,356,103 | 8/1944 | Tourjee | 221/68 X |
| 3,032,235 | 5/1962 | Reeder | 221/167 |
| 3,170,595 | 2/1965 | Stein | 221/168 X |
| 3,448,236 | 6/1969 | Spisak | 219/98 |

*Primary Examiner*—Robert B. Reeves
*Assistant Examiner*—Francis J. Bartuska
*Attorney, Agent, or Firm*—Allen D. Gutchess, Jr.

[57] ABSTRACT

A stud feeder for supplying studs to a stud welding tool comprises a rotating hollow member having a notched peripheral edge through which the studs are passed when properly oriented. The studs are fed along a track to an escapement and are subsequently blown through a flexible tube to the stud welding tool. The feeder features a removable cover which provides ready access to the stud track in the event of jamming and also features a simplified air control system for operating the overall feeder. The feeder is also of simplified, low-cost construction and is relatively maintenance free.

5 Claims, 10 Drawing Figures

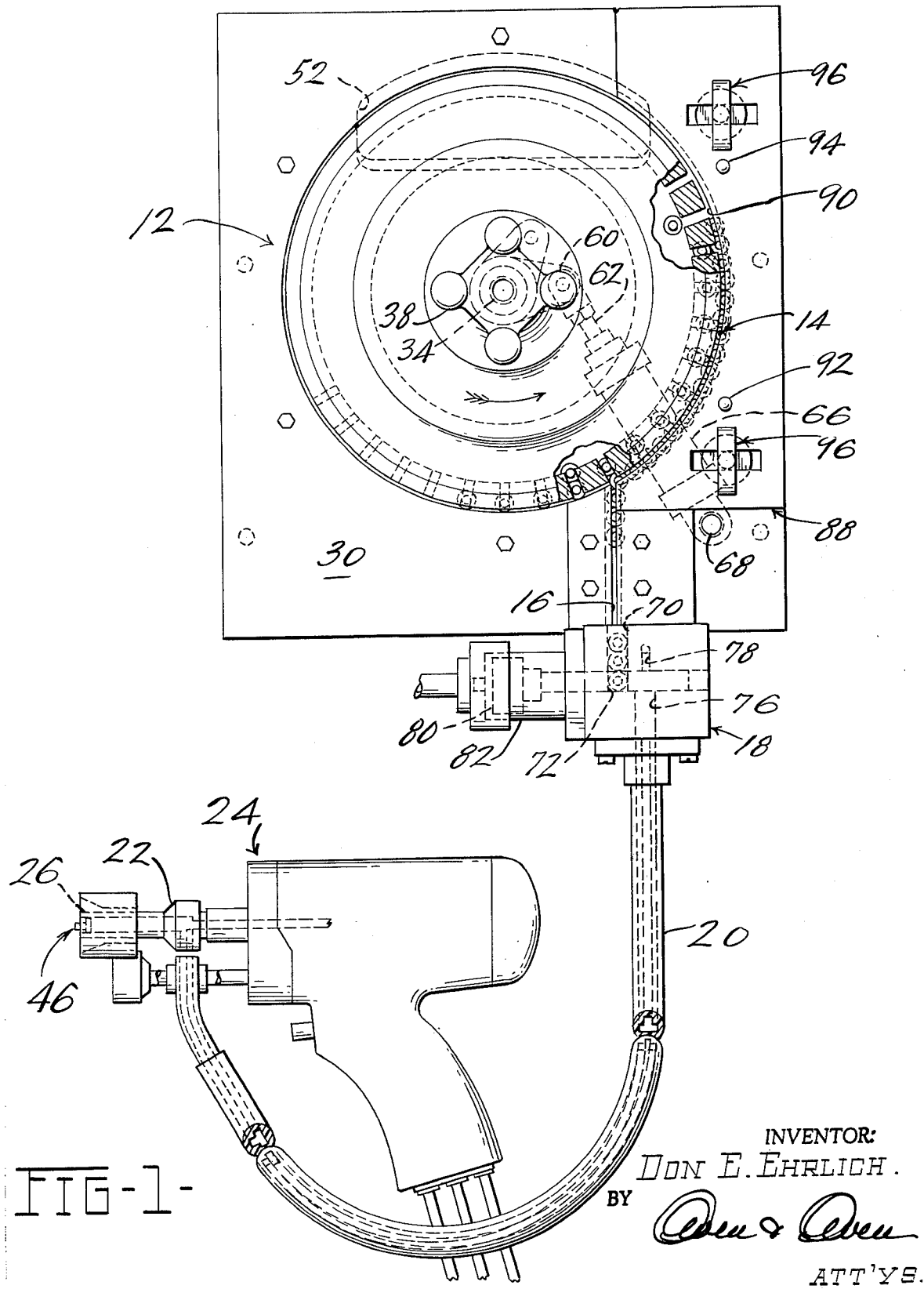

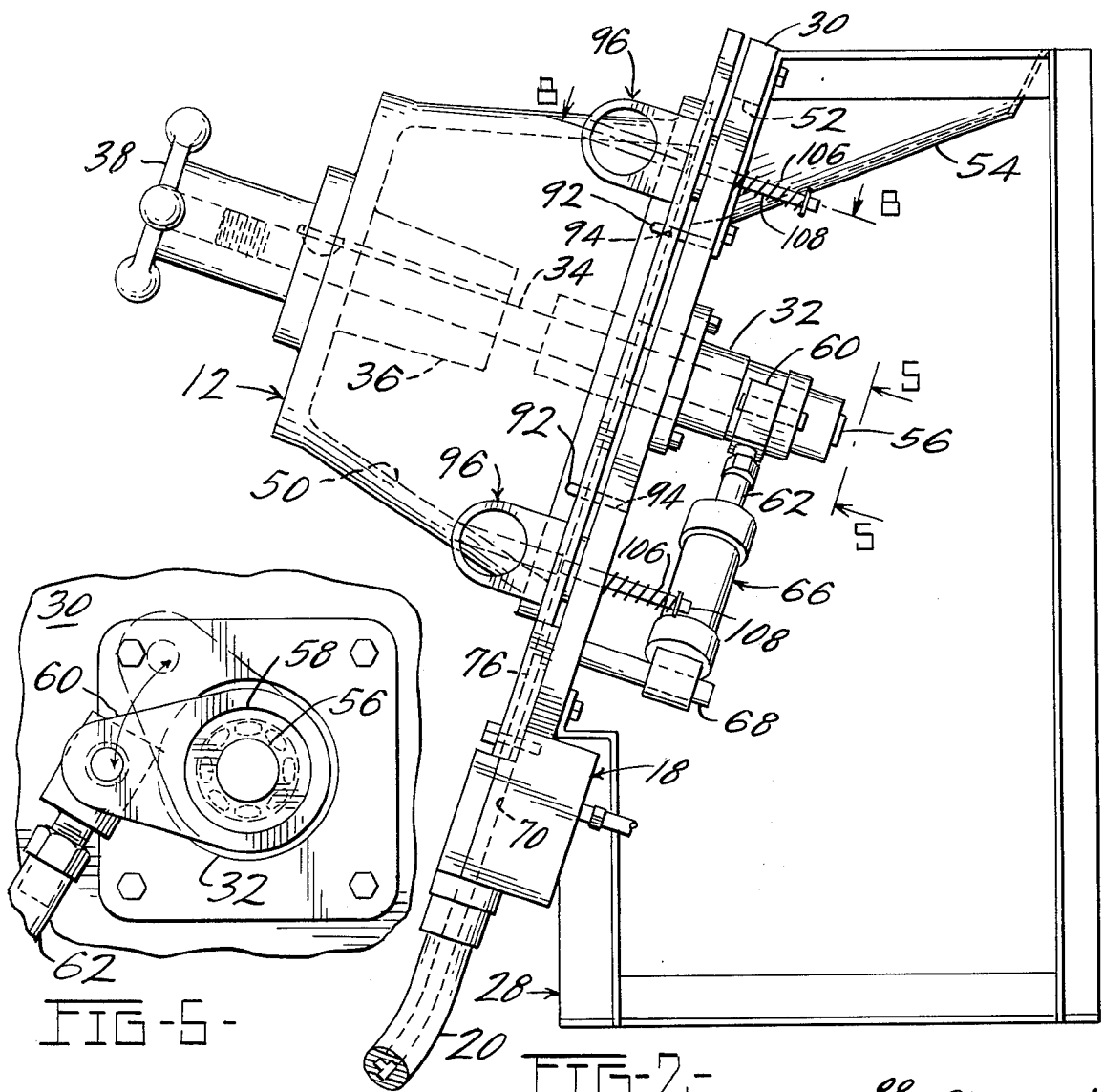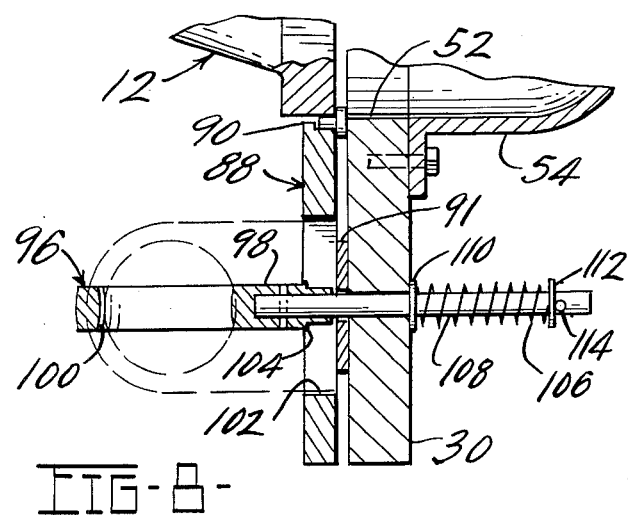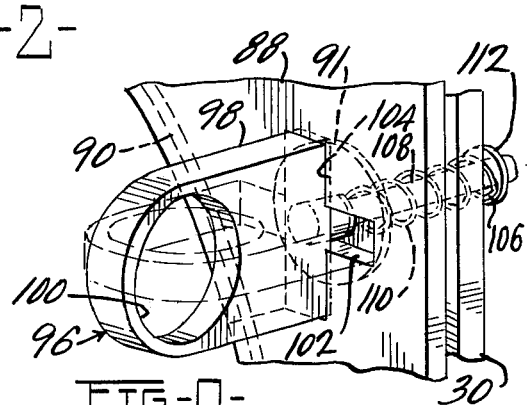

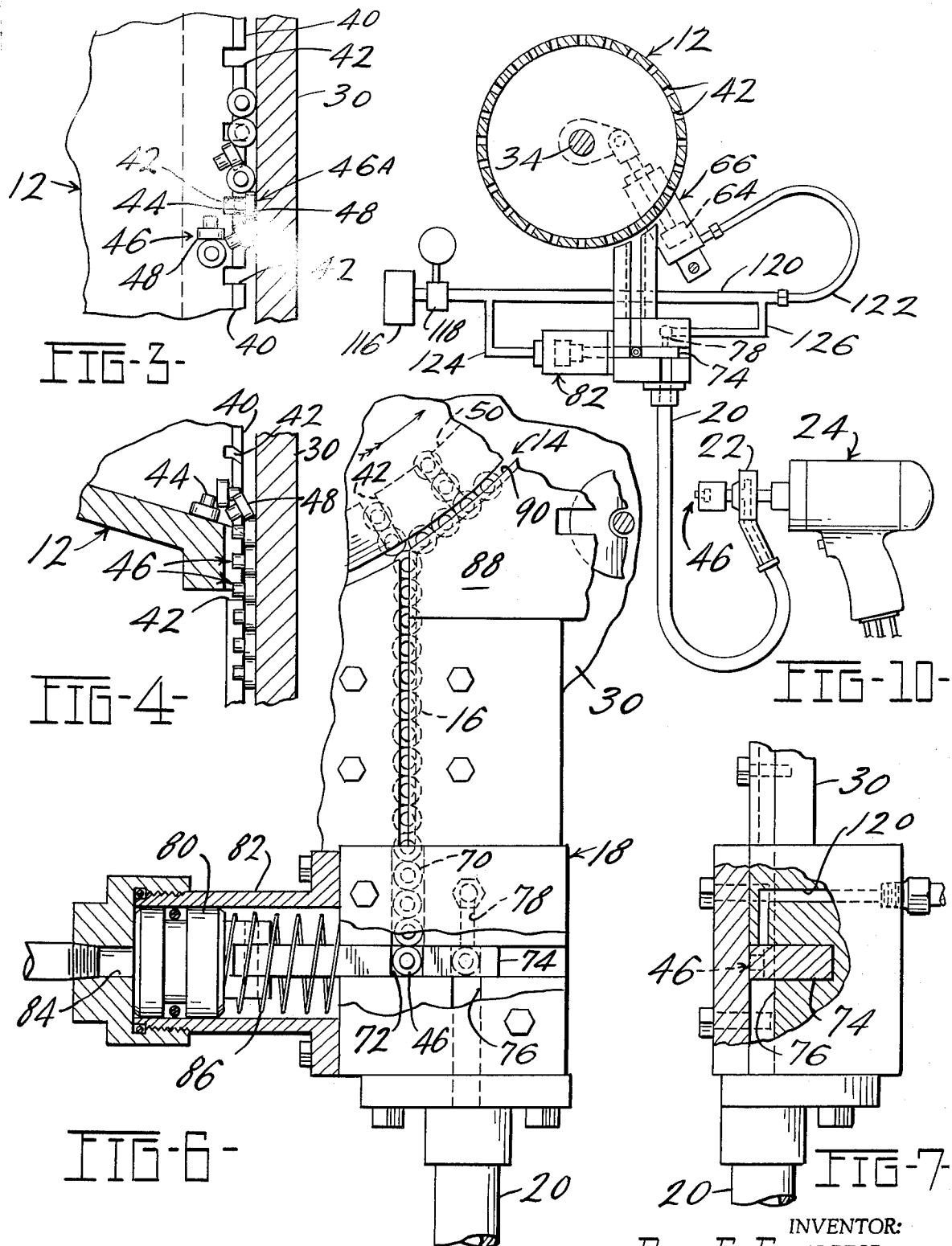

3,900,131

STUD FEEDER FOR STUD WELDING TOOLS

This application is a continuation of application Ser. No. 275,675, filed on July 27, 1972, now abandoned, which is a continuation of application No. 41,691, filed on May 25, 1970, now abandoned, which is a continuation of application Ser. No. 723,852, filed on Apr. 24, 1968, now abandoned.

This invention relates to apparatus for feeding studs to a stud welding tool.

In recent years, the use of stud welding tools to apply studs in large quantities and at relatively high welding rates to various workpieces has become more prevalent. Concomitantly, this has required an automatic feeding system for supplying the studs to the chucks of the stud welding tools in order to maintain the relatively high welding rates. The feeding systems heretofore employed, however, have been of relatively complicated and costly design, along with relatively high maintenance expense.

The present invention provides a stud feeding system and a stud supply which involves a minimum of moving parts and is of a simple and inexpensive design. Maintenance requirements for the system also are held to a minimum.

The new feeding system includes a stud supply which comprises a hollow rotating member or drum having a notched peripheral edge. A supply of studs is located within the drum and the studs then pass outwardly through the notches when properly oriented with respect thereto. The studs are received in an arcuate track beyond the peripheral edge of the drum and are then fed to an escapement and blown one at a time through a flexible tube to the stud welding tool.

The feeding system includes a removable cover with a unique quick-release arrangement by means of which access can be readily had by an operator to the arcuate track in the event studs should jam therein. The feeding system also has a simplified air supply and control arrangement by means of which the hollow member can be rotated, the escapement can be operated, and the studs can be blown through the flexible tube to the stud welding tool with the use of only a single valve.

It is, therefore, a principal object of the invention to provide stud welding apparatus with an improved stud feeding system for supplying studs one at a time to a stud welding tool.

Another object of the invention is to provide an air-operated stud feeder with an improved, simplified air control system.

Yet another object of the invention is to provide a stud supply arrangement for a stud feeding system embodying a quickly-releasable cover.

Numerous other objects and advantages of the invention will be apparent from the following detailed description of a preferred embodiment thereof, reference being made to the accompanying drawings, in which:

FIG. 1 is substantially a front view in elevation, but taken at an angle parallel to the axis of rotation, of a stud feeding system including a rotatable hollow member for supplying the studs in an oriented manner to a stud welding tool;

FIG. 2 is a right side view in elevation of the apparatus of FIG. 1, but with the stud welding tool omitted;

FIG. 3 is a fragmentary view looking downwardly inside the rotatable hollow member at an annular notched edge thereof;

FIG. 4 is a fragmentary, generally vertical sectional view of a portion of a transfer track down which the studs are fed and the notched edge of the rotatable member;

FIG. 5 is a detailed view taken along the line 5—5 of FIG. 2 of apparatus for rotating the hollow member;

FIG. 6 is an enlarged front view in elevation of an arcuate track and the transfer track for the studs and an escapement associated therewith, with parts broken away and with parts in section;

FIG. 7 is a right end view of the escapement of FIG. 6, along with fragmentary portions of components associated therewith, and with parts broken away and with parts in section;

FIG. 8 is an enlarged sectional view taken along the line 8—8 of FIG. 2 of releasable means for a removable cover;

FIG. 9 is a perspective view of the releasable means of FIG. 8; and

FIG. 10 is a somewhat diagrammatic view of an air control and drive system for the overall stud feeder.

Referring particularly to FIG. 1, the overall stud feeding system embodying the invention includes a hollow rotatable member or drum 12 containing a supply of studs. When the studs are properly oriented, they are fed to an arcuate track 14 located adjacent a portion of the member 12 from which the studs are fed down a transfer track 16 to an escapement 18. From here, the studs are blown one at a time through a flexible tube 20 to a receiver 22 of a stud welding tool 24. From the receiver, the studs are pushed to a chuck 26 of the tool by an internal plunger arrangement (not shown), as is known in the art.

Referring more particularly to FIG. 2, a supporting stand 28 for the hollow rotatable member 12 also serves as a housing for certain components of the feeding system. A base plate or wall 30 is supported at an angle to the horizontal by the supporting stand 28 with the plate preferably being located near a vertical position. A bearing block 32 is mounted on the plate 30 and extends therethrough and partly into the hollow member 12. A supporting shaft or axle 34 is rotatably held by the bearing block 32 and extends substantially perpendicularly to the base plate 30. The shaft 34 is received by a hub 36 of the rotatable member 12 and terminates in an external handle 38.

As shown particularly in FIGS. 3 and 4, the hollow member 12 is positioned on the shaft 34 in a manner such that a peripheral edge 40 of the member 12 is located close to but slightly spaced from the base plate 30. The edge 40 has a plurality of notches or openings 42 therein of a size and shape to receive a stem 44 of a small stud 46 which is to be welded by the tool 24. The stud 46 also has a head 48 which is received between the edge 40 and the adjacent surface of the plate 30 when the stud is properly oriented and the stem 44 extends into the notch 42, as shown, for example, by a stud designated 46A. The notches 42 are long enough to receive two of the studs 46 at one time, although this is not essential.

The studs are carried in a supply chamber 50 formed by the interior of the hollow rotatable member 12 and the mounting plate 30. They are supplied to this chamber through an opening 52 in the plate 30, there being a supply chute 54 communicating with the opening 52 to facilitate adding studs to the chamber 50. The studs lie in the bottom of the chamber 50 as the member 12 is rotated and fall into the notches 42 when they are properly oriented and aligned with respect thereto. At this point, the studs can move to the outer ends of the notches 42 as shown in FIG. 4.

For rotating the member 12, an extension 56 of the shaft 34 is received in a one-way clutch 58 (FIG. 5). A lever arm 60 is mounted on the clutch 58 and pivotally receives a piston rod 62 of a piston 64 (FIG. 10) in a fluid-operated cylinder 66. The cylinder 66 is suitably pivotally supported on a stub shaft 68 (FIG. 2) carried by the base plate 30. When the piston rod 62 is suddenly extended by air supplied to the blind end of the cylinder 66, it moves the lever arm 60 in a clockwise direction, as shown in FIG. 5, and causes the shaft extension 56, the shaft 34, and the rotatable member 12 to rotate. The hollow member 12 may turn as many as two revolutions because the shaft extension 56 can rotate independently of the clutch 58 after it receives the initial driving torque or impulse from the lever 60.

As the rotatable hollow member 12 moves in a counterclockwise direction, as shown in FIG. 6, and as the oriented studs are received in the notches 42, they are carried in the notches 42 until they reach a clear portion of the arcuate track 14, at which time the studs move into the track 14 from the notches 42 by a combination of gravity and centrifugal force. If the arcuate track 14 is filled with the studs 46 approximately up to a horizontal line extending through the axis of the member 12, and usually somewhat beyond, depending upon the degree of the centrifugal force, then the studs will drop back through the notches 42 into the chamber 50 and there remain until received in another one of the notches 42 and again carried upwardly.

With this arrangement, it is never possible for the complete track 14 to become full since the studs will always drop out of the upper ones of the notches 42 under such conditions. Consequently, there is no need to employ any special sensing devices to stop the operation of the feeder if the track becomes full, as has heretofore been necessary. Such devices add to the initial cost and also represent another component requiring maintenance. Upon initial operation, the rotatable member 12 can be manually rotated through the handle 38 to initially at least partially fill the transfer track 16 and the arcuate track 14, too, if desired.

The studs in the arcuate track 14 feed by gravity through the transfer track 16 which is of T-shaped configuration, similar to the cross-sectional shape of the studs 46. The studs in the transfer track 16 pass through an entry track 70 in the escapement 18 and are individually received in a notch 72 formed in a transfer bar 74 which carries them to an exit track 76. The stud is then blown down the track 76 by air supplied through a nozzle or passage 78 located above the slide bar 74. The stud enters the passage in the flexible tube 20 with the stem facing upwardly or outwardly, as shown in FIG. 1, with the tube 20 then being twisted before reaching the stud receiver 22 of the tool 24 so that the stem faces forwardly of the tool and projects from the chuck 26 when positioned therein.

The slide bar 74 is connected to a piston 80 (FIG. 6) in a cylinder 82 with air supplied to the blind end of the cylinder through a supply passage 84 and with the piston urged toward the blind end by a return spring 86. The piston 80 is normally urged to the blind end of the cylinder by the spring 86, with the notch 72 thereby aligned with the entry track 70.

A feature of the stud supply system is a removable cover plate 88 (FIG. 1) which has an arcuate edge 90 forming part of the track 14. The edge 90 also preferably extends over the ends of the studs 46 to help retain the studs in the track. The cover plate 88 is spaced from the base plate 30 by spacers or shims 91 to receive a portion of the stud heads 48 between the plates 88 and 30 (see FIG. 8). Because occasional jamming is almost inevitable, it is important that the cover plate 88 be readily removable to clear jamming in the arcuate track 14 or the upper portion of the transfer track 16. The cover plate 88 is precisely located on the base plate 30 by locating pins 92 (FIG. 2) extending from the base plate and projecting through openings 94 in the cover plate 88. This enables the cover plate to be precisely located with the edge 90 in the proper relationship with the track 14 and with the annular edge 40 of the rotatable member 12.

The cover plate 88 is held on the pins 92 against the base plate 30 by a pair of quick-disconnect fasteners 96 as shown in detail in FIGS. 8 and 9. The fasteners 96 include elongate clamp members 98 having finger openings 100 by means of which an operator can quickly grasp the clamp members 98 to release the plate by turning them 90° to align them with elongate slots 102 in the cover plate 88. When the clamping members 98 are perpendicular to the slots 102, they are prevented from rotating until pulled outwardly slightly by being received in shallow recesses 104 formed in the cover plate 88 perpendicularly to the slots 102. The clamp members 98 are urged against the cover plate 88 to hold it securely in position by means of coil springs 106 mounted around shanks 108 extending from the clamping members 98 through the cover plate 88 and through the base plate 30. The springs 106 are maintained in compression between washers 110 and 112, the latter being backed up by a transverse pin 114. With this arrangement, the operator can remove the cover in a matter of seconds by turning the clamping members 98 one-quarter turn to align them with the slots 102, at which time the cover plate 88 can be lifted off the locating pins 92.

The arrangement of the feeding system enables air controls for operating the system to be of utmost simplicity. Referring to FIG. 10, air for the drive cylinder 66 for rotating the hollow member 12, air for the cylider 82 to operate the slide bar 74, and air for the nozzle passage 78 to blow the studs down the tube 20 is supplied from an air source indicated at 116. The air for all three operations is controlled by a single valve 118 which can be manually or electrically operated between welds by the welding tool. When the valve 118 is opened, it supplies air through lines 120 and 122 to the blind end of the cylinder 66 to drive the piston 64 forwardly and pulse the shaft extension 56, thereby rotating the member 12 through the operation of the one-way clutch 58. When the hollow rotatable member 12 is rotated, it carries any studs received in the notches 42 upwardly in a counterclockwise direction and deposits them in the track 14, if there is space for the studs. At the same time, the air is supplied through a line 124 and the passage 84 to the blind end of the cylinder 82 to cause the piston 80 to move outwardly and thereby move the slide bar 74 toward the right so that the notch 72 and a stud therein become aligned with the exit track 76 rather than the entry track 70. Simultaneously, air is supplied through the line 120 and a line 126, to the nozzle passage 78 to blow the stud down the tube 20 to the stud welding tool 24. Hence, the single valve 118 supplies air simultaneously to rotate the rotatable member 12 and feed the studs to the track 14 and the transfer track 16, to move the slide bar 74 and transfer a stud from the track 16 to the flexible tube 20, and to blow the stud down the tube to the tool. Hence, operation of the feeding system is effected with minimum cost and maintenance and maximum simplicity.

Various modifications of the above described embodiment of the invention will be apparent to those skilled in the art, and it is to be understood that such modifications can be made without departing from the scope of the invention, if they are within the spirit of the accompanying claims.

I claim:

1. Stud feeding apparatus for feeding weldable studs, each having a head and a stem one at a time to a stud welding tool, said apparatus comprising a removable cover plate having a stepped arcuate edge forming a recess to receive stems of the studs, means forming a chamber containing a plurality of the studs, said chamber forming means including a base plate supported at an angle to the horizontal, and a hollow rotatable member having an annular edge located in a plane closely adjacent said base plate, means supporting said rotatable member for rotation about an axis perpendicular to said base plate and to the plane of said annular edge, said annular edge of said member having a plurality of notches extending thereacross and shaped to receive the studs from the chamber when in a predetermined orientation with the heads of the studs adjacent said base plate, means spacing at least the stepped edge of said cover plate from said base plate a distance exceeding the thickness of the stud heads, the stepped edge of said cover plate and the annular edge of said hollow rotatable member cooperating with said base plate to form an arcuate track extending alongside a portion of said annular edge of said rotatable member and positioned to receive the studs which pass through said notches in said rotatable member from said chamber, with the stems of the studs in the stepped edge recess and the heads projecting between said cover plate and said base plate and also between said annular edge of said hollow rotatable member and said base plate.

2. Stud feeding apparatus according to claim 1 characterized by a clamp member attaching said cover plate to said base plate for enabling said cover plate to be removed quickly for access to said arcuate track, said clamp member having a rod extending therefrom through an elongate opening in said cover plate and through an opening in said base plate to the side of said base plate opposite said cover plate, said cover plate having a shallow recess positioned at an angle to said elongate opening to receive a portion of said clamp member and to prevent said clamp member from rotating when aligned with said recess, and resilient means engaging said rod and urging said clamp member toward said cover plate to urge said cover plate toward said base plate when said elongate member is not in alignment with said elongate opening in said cover plate.

3. Stud feeding apparatus according to claim 1 characterized further by said spacing means also spaces the surface of said cover plate which is closer to said base plate a distance from said base plate exceeding the thickness of said heads.

4. Stud feeding apparatus for feeding studs one at a time to a stud welding tool, said apparatus comprising a hollow, rotatable member having a plurality of openings of similar shape located in an annular peripheral portion of said member, means supporting said rotatable member for rotation about an axis perpendicular to a plane through said openings, means forming an arcuate track extending alongside a portion of said openings of said rotatable member and positioned to receive studs which pass through said openings from the interior, means forming a transfer track communicating with said arcuate track, an escapement mechanism having an entry track communicating with said transfer track, and an exit track transversely spaced from said entry track, a slide bar having an opening selectively communicating with either one of said entry and exit tracks, a feed tube communicating with said exit track, a fluid supply passage associated with said escapement for supplying fluid through said exit track and said feed tube to convey a stud from said slide bar through said exit track and through said feed tube, pneumatically-operated cylinder means for rotating said hollow, rotatable member second pneumatically-operated cylinder means for operating said slide bar, and a single valve for simultaneously supplying air to said second cylinder means to move said slide bar such that said slide bar opening moves from a position in communication with said entry track to a position in communication with said exit track, to said cylinder means for rotating said rotatable member, and to said fluid supply passage for propelling a stud through said exit track and said feed tube.

5. Stud feeding apparatus for feeding studs one at a time to a stud welding tool, said apparatus comprising a hollow, rotatable member having a plurality of openings of similar shape located in an annular peripheral portion of said member, means supporting said rotatable member for rotation about an axis perpendicular to a plane through said openings, a base plate, means forming an arcuate track extending alongside a portion of said openings of said rotatable member and positioned to receive studs which pass through said openings from the interior, said arcuate track means comprising a cover plate having a stepped arcuate edge forming a recess to receive stems of the studs, means spacing at least the stepped edge of said cover plate from said base plate a distance exceeding the thickness of heads of the studs, the stepped edge of said cover plate and an annular edge of said hollow rotatable member cooperating with said base plate to form the arcuate track, means forming a transfer track communicating with said arcuate track, an escapement mechanism having an entry track communicating with said transfer track, and an exit track transversely spaced from said entry track, a slide bar having an opening selectively communicating with either one of said entry and exit tracks, a feed tube communicating with said exit track, a fluid supply passage associated with said escapement for supplying fluid through said exit track and said feed tube to convey a stud from said slide bar through said exit track and through said feed tube, pneumatically-operated cylinder means for rotating said hollow, rotatable member, second pneumatically-operated cylinder means for operating said slide bar, and means for simultaneously supplying air to said second cylinder means to move said slide bar such that said slide bar opening moves from a position in communication with said entry track to a position in communication with said exit track, to said cylinder means for rotating said rotatable member, and to said fluid supply passage for propelling a stud through said exit track and said feed tube.

* * * * *

UNITED STATES PATENT OFFICE
CERTIFICATE OF CORRECTION

PATENT NO. : 3,900,131
DATED : August 19, 1975
INVENTOR(S) : Don E. Ehrlich

It is certified that error appears in the above-identified patent and that said Letters Patent are hereby corrected as shown below:

Column 6, line 23, after "member" insert a comma.

Signed and Sealed this twenty-first Day of October 1975

[SEAL]

Attest:

RUTH C. MASON
Attesting Officer

C. MARSHALL DANN
Commissioner of Patents and Trademarks